United States Patent [19]

Curran

[11] Patent Number: 4,481,612
[45] Date of Patent: Nov. 6, 1984

[54] SEISMIC SURVEYING USING SHEAR WAVES

[75] Inventor: John W. Curran, Houston, Tex.

[73] Assignee: Exxon Production Research Co., Houston, Tex.

[21] Appl. No.: 196,008

[22] Filed: Oct. 10, 1980

[51] Int. Cl.³ .......................... G01V 1/053; G01V 1/40
[52] U.S. Cl. ..................................... 367/75; 181/103; 181/106; 181/113; 181/117
[58] Field of Search ............... 181/106, 400, 401, 402, 181/103, 105, 117, 119, 111, 113; 367/25, 31, 75, 140, 156, 55; 124/56; 166/249, 250; 89/1.7 A, 1 C

[56] References Cited

U.S. PATENT DOCUMENTS

| | | | |
|---|---|---|---|
| 2,908,342 | 10/1959 | Itria et al. | 181/111 |
| 3,054,473 | 9/1962 | Gerrard | 367/55 |
| 3,221,833 | 12/1965 | Malmberg | 181/106 |
| 3,260,327 | 7/1966 | McCollum | 181/117 |
| 3,354,983 | 11/1967 | Erickson et al. | 367/75 X |
| 3,380,551 | 4/1968 | Lang | 181/106 |
| 3,794,976 | 2/1974 | Mickler | 367/75 |
| 4,042,063 | 8/1977 | Waters | 181/106 X |
| 4,284,164 | 8/1981 | Airhart | 181/117 |
| 4,284,165 | 8/1981 | Airhart et al. | 181/117 X |
| 4,310,066 | 1/1982 | Won | 181/401 |
| 4,380,806 | 4/1983 | Waters et al. | 367/75 X |

FOREIGN PATENT DOCUMENTS

| | | | |
|---|---|---|---|
| 944472 | 3/1974 | Canada | 181/113 |
| 19332 | 9/1914 | United Kingdom | 89/1.7 A |
| 921692 | 3/1963 | United Kingdom | 181/121 |
| 1300317 | 12/1972 | United Kingdom | . |

Primary Examiner—Maynard R. Wilbur
Assistant Examiner—K. R. Kaiser
Attorney, Agent, or Firm—Alfred A. Equitz; James S. Hsue

[57] ABSTRACT

The shear wave source of this invention includes a housing and means for applying forces to the shot hole wall. The force applying means applies a number of forces to the shot hole wall along lines normal to a plane close to the shot hole. No pressure waves, but only shear waves are generated at distant points on the plane. At least one of the forces is applied in opposite direction to the other forces to reduce the net recoil of the housing.

A first, second and third force are applied at three source points in the observation plane along three lines normal to the plane to generate respectively a first, second and third shear wave in the plane. The first and third forces are equal in magnitude and the second force has twice the magnitude of the first force. The first and third forces are applied along lines in the same direction, but the second force is applied along a line opposite in direction to the lines of the first and third forces. The three forces are so applied that, at any distant point on the observation plane, the second shear wave lags the first shear wave in phase by a predetermined amount and a third shear wave lags the second shear wave in phase by the same amount. The three shear waves will interfere to produce a resonance. Generation of shear waves with frequencies at or close to the resonance frequencies is thereby enhanced, and generation of shear waves with other frequencies is thereby retarded.

29 Claims, 9 Drawing Figures

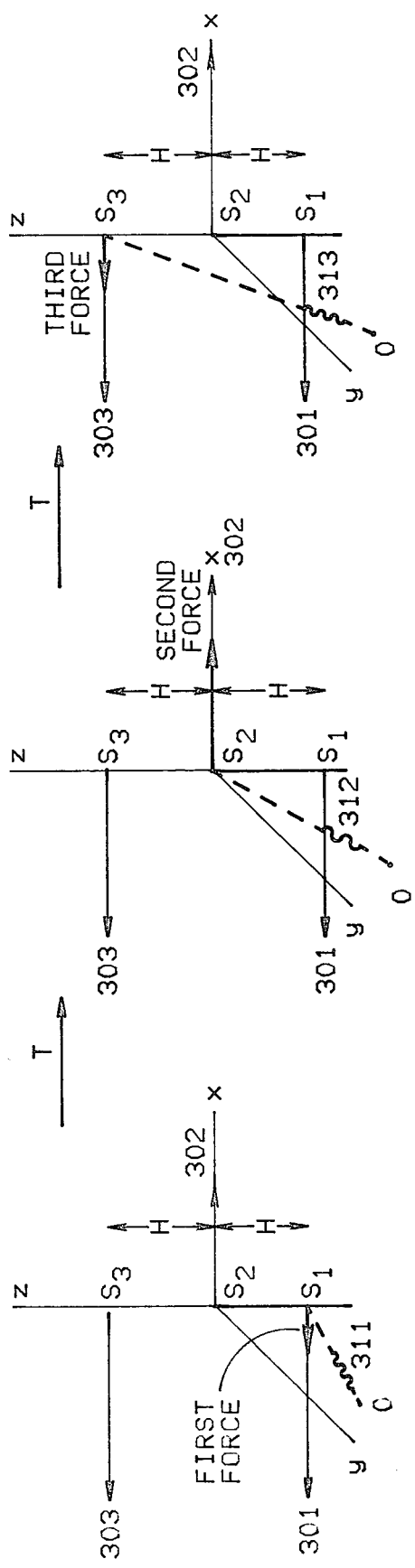
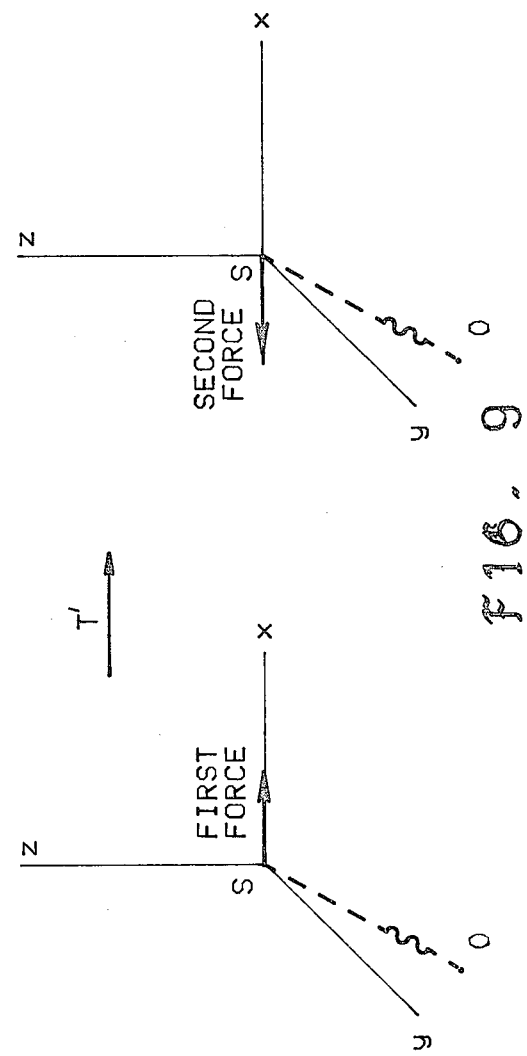
FIG. 8
FIG. 9

SEISMIC SURVEYING USING SHEAR WAVES

BACKGROUND OF THE INVENTION

1. Field of the Invention

This invention has to do with seismic surveying using shear waves. More specifically it is directed to methods and apparatuses for generating shear waves wherein substantially no pressure wave is generated in a selected plane.

2. Description of the Prior Art

In a shear wave, the motion of the earth particles is normal to the direction of propagation of the wve. The advantages of using shear waves for seismic prospecting are well known in the art. At a given frequency shear waves travel through the earth at a speed only a fraction of the speed of pressure waves so that the shear waves have shorter wave lengths than those of pressure waves having the same frequency. This results in better resolution in seismic profiles.

Many shear wave seismic sources have been proposed including sources that may be used in shot holes. In U.S. Pat. No. 2,880,816 (1959), Widess et al disclosed that ordinarily the detonation of a charge in the earth creates little downward traveling seismic shear wave energy because the horizontal movement of earth particles caused by the detonation is symmetrical about a vertical axis or plane through the charge. For the detonation to generate significant downward traveling shear wave energy, this movement should be asymmetrical. Accordingly, Widess et al proposed detonating asymmetrically a symmetric explosive charge such as an elongated explosive column ignited at one end of the column, or a block of explosive with a concave face ignited at a point on the surface of the block on the other side of the concave face. Alternatively, a symmetric explosive charge may be detonated at a boundary between two media of substantially different wave transmitting properties. All the shear wave sources proposed by Widess, however, appear to generate pressure waves in all directions and in all planes reached by the seismic waves.

Trulio et al, in U.S. Pat. No. 4,103,756 (1978), proposed a rotational device which may be used in bore holes to generate pressure and shear waves. The device comprises a striker having a number of mass elements collectively rotatable about the bore hole axis. At selected rotational speeds, the mass elements are released so that they angularly impact the periphery of the bore hole at points circularly distributed along the periphery. The mass elements are equipped with teeth to grip the bore hole periphery upon impact thereby generating both pressure and shear waves. The pressure waves generated by the device appear to propagate in all directions and in all planes reached by the seismic waves.

An air gun device is proposed by Murphy in U.S. Pat. No. 4,038,631 (1977) for use in bore holes for generating pressure waves and shear waves. The air gun device comprises an elongated cylinder having a single discharge port opening out radially on one side only for abruptly releasing compressed air in a direction perpendicular to the axis of the air gun. Firing of the air gun generates pressure waves and shear waves in a zone of earth surrounding the bore hole. As pressurized air is discharged from the vent port of the air gun to exert a force on the bore hole wall for generating seismic waves the air gun recoils according to Newton's Third Law of Motion. Different parts of the air gun may be caused to hit the borehole wall at different locations, generating shear waves in a random fashion. Since the impact of the air gun on the borehole wall caused by recoil is comparable in strength to the impact of the pressurized air, the shear waves generated by recoil have relatively significant amplitudes and will appear as high noise levels in the shear wave record. Murphy et al have not disclosed how the recoil of the air gun may be controlled or reduced to alleviate this problem.

Kitsunezaki, in U.S. Pat. No. 4,207,961 (1980), disclosed a shear wave logging method. A magnetic field is formed by a permanent magnet and a iron yoke suspended in a borehole filled with water. A bobbin assembly equipped with coils is disposed in the magnetic field so that it may slide with respect to the magnet and the yoke along a line perpendicular to the axis of the borehole. If current is passed through the coils, the bobbin assembly will move in either one of two opposite directions of the line, depending on the direction of current. During its motion, the bobbin assembly ejects a volume of water on one side and sucks in the same volume of water on the opposite side. It is stated that since there is no net change in volume of the water, no pressure wave is generated. But the ejection and suction of water create positive and negative pressures on the borehole wall, which will generate waves. Recoil causes the permanent magnet and the yoke to move in an opposite direction to that of the bobbin assembly. A heavy mass is attached to the magnet and the yoke to reduce their recoil displacements. Such a recoil reducing method may, however, be impractical if strong recoil forces are generated, as in shear wave seismic prospecting.

BRIEF DESCRIPTION OF THE DRAWINGS

FIG. 8 is a schematic view illustrating a preferred method of this invention wherein the generation of shear waves with selected frequencies is enhanced and the generation of shear waves with other frequencies is retarded.

FIG. 9 is a schematic view illustrating an alternative method of this invention.

SUMMARY OF THE INVENTION

Figure 1:
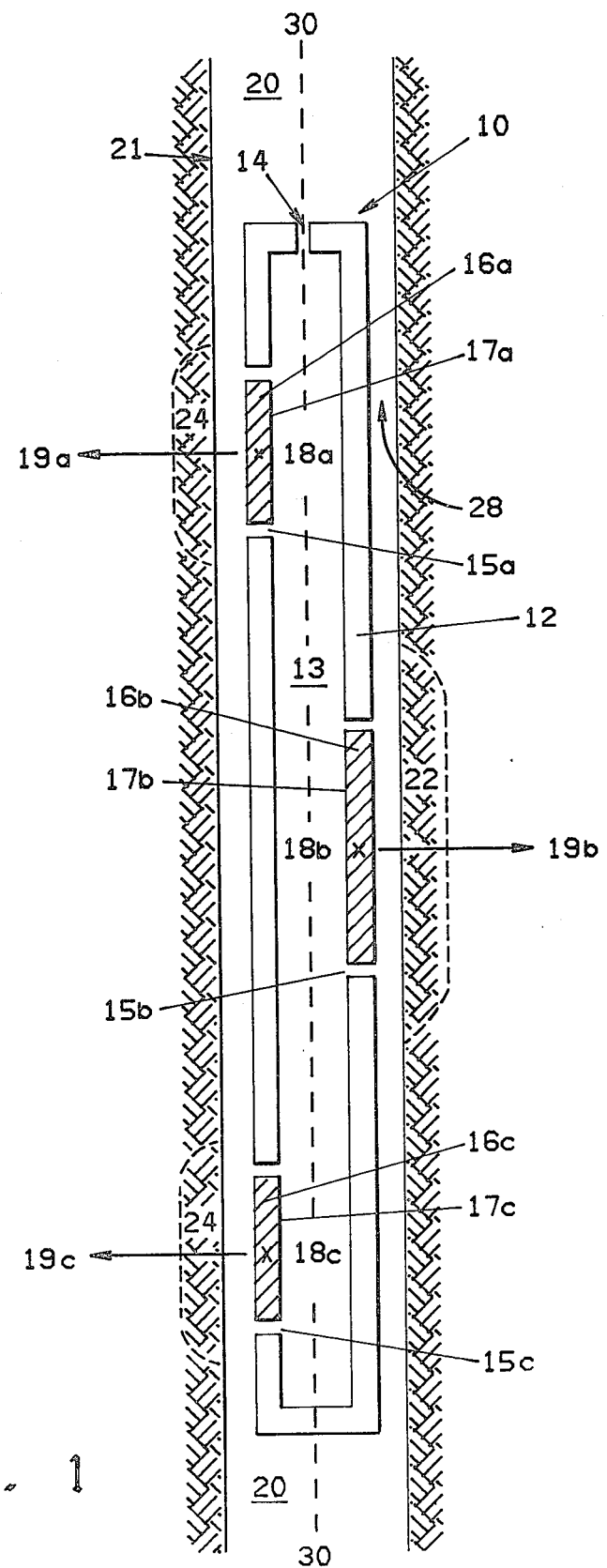
FIG. 1 is a schematic simplified view of a shear wave seismic source illustrating the preferred embodiment of this invention.

The apparatus of this invention comprises a housing adapted to be suspended in a shot hole, and a force applying means coupled to the housing. The force applying means applies a plurality of forces to the wall of the shot hole along lines substantially normal to a selected plane close to the shot hole so that substantially no pressure wave is generated at any distant point on the plane. Of the forces applied, at least one force is applied along a line substantially opposite in direction to the lines of the remaining forces so that the net recoil of the housing is reduced.

In a preferred method of this invention, a first, second and third force are applied at three source points substantially in a selected plane, and along three lines substantially normal to the selected plane, to generate respectively a first, second and third shear wave in the selected plane. The first and third forces are approximately equal in magnitude, and the second force has approximately twice the magnitude of the first force. The second force is applied along a line substantially opposite to the lines of the first and third forces. The three forces are so applied that, at any distant observation point, the second shear wave lags the first shear wave in phase by a predetermined amount, and the third shear wave lags the second shear wave in phase by substantially the same amount. The three shear waves will interfere to produce a resonance.

In an alternate method of this invention, a first and a second force, substantially equal but opposite in direction, are applied successively substantially at the same source point in a selected plane. At distant points in the plane, the shear waves generated will interfere to produce a resonance.

DESCRIPTION OF THE PREFERRED EMBODIMENTS

It may be derived from traditional elasticity theory that a force acting at one point in one direction in an infinite elastic space produces a region in which there is no pressure wave motion but only shear wave motion.

For a detailed account of traditional elasticity theory, see *A Treatise on the Mathematical Theory on Elasticity*. by A. E. H. Love, Dover Publications, Fourth Edition, New York (1944). The result referred to above may be derived from equations 36 on page 305 of the book. It may be seen from the equations that if a force is applied at a point in an elastic medium in a direction, the region where there is no pressure wave motion is distant from the point at which the force acts, and that it comprises the distant portion of a plane which passes through the point, and which is normal to the direction of the force. Therefore, if a unidirectional point seismic source is used as the shear wave source, only shear wave motion will reach geophones placed far from the source on a plane which passes through the point source and which is normal to the direction of the force exerted by the source.

When a unidirectional seismic source is fired in a selected direction the source will recoil in the direction opposite to the selected direction. This force of recoil, if allowed to act upon the medium in which seismic waves are to be generated, may generate substantial noise in the seismic records produced.

FIG. 1 is a schematic simplified view of a shear wave seismic source illustrating the first preferred embodiment of this invention. As shown in FIG. 1, the shear-wave seismic source 10 comprises a hollow housing 12. Housing 12 defines therein a chamber 13 and has a port 14 through which pressurized air may be introduced into chamber 13. Housing 12 has three channels 15a, 15b and 15c into which are fitted three respective strikers 16a, 16b, and 16c. Housing 12 is suspended by a cable (not shown in FIG. 1) into a medium 28 in a shot hole 20. Pressurized air is introduced into chamber 13 through port 14. The difference in pressure between chamber 13 and medium 28 causes strikers 16a and 16c to move out from housing 12 and strike a portion 24 of the wall 21 of shot hole 20. The pressure differential also causes striker 16b to move out from housing 12 to hit a portion 22 of the wall 21.

The three strikers 16a, 16b and 16c have centers of gravity at 18a, 18b and 18c, respectively. When strikers 16a, 16b and 16c move out from housing 12, their centers of gravity 18a, 18b and 18c move along lines 19a, 19b and 19c, respectively, along the directions indicated by the arrows in FIG. 1. Such directions may be said to be the directions of lines 19a, 19b and 19c. Channels 15a, 15b and 15c are so positioned in housing 12 that lines 19a, 19b and 19c are substantially normal to a plane 30. Plane 30, as shown in FIG. 1, is a plane perpendicular to the plane of FIG. 1.

Shear waves are generated when strikers 16a, 16b and 16c impact portions 22 and 24, and such shear waves emanate from the locations of portions 22 and 24. To distant observers located on plane 30, portions 22 and 24 are substantially on plane 30. Thus, at distant observation points on plane 30, the forces exerted by strikers 16a, 16b and 16c appear to be applied at points on plane 30, and along lines normal to plane 30. At such points, therefore, substantially no pressure wave is generated by the impacts of the strikers. For planes that do not pass through the shot hole but are close to the shot hole, the shear waves from portions 22 and 24 will also apper to be generated at points on those planes to observers at distant observation points on those planes. Thus, it is not necessary for plane 30 to pass through the shot hole; plane 30 needs only be close enough so that the above approximation applies.

The three strikers 16a, 16b and 16c have respective faces 17a, 17b and 17c which face chamber 13. The areas of 17a and 17c are substantially the same so that the difference in pressure between medium 28 and chamber 13 exerts a substantially equal force on strikers 16a and 16c. Preferably, the area of face 17b is approximately twice that of 17a. Therefore, the force exerted on striker plate 16b is approximately twice that exerted on 16a or 16c. Line 19b is substantially opposite in direction to the directions of lines 19a and 19c. Thus, the force exerted on striker plate 16b is equal and opposite to the sum of forces acting upon striker plates 16a and 16c. Therefore, the net force of recoil on housing 12 caused by motion of the strikers is substantially zero. For there to be essentially no rotation of housing 12, the torques on the housing caused by recoil about the center of gravity of the housing should be substantially zero. If the center of gravity of the housing lies on line 19b, and the distance between 18a and 18b is substantially equal to the distance between 18a and 18c, and lines 19a, 19b and 19c are substantially coplanar, the net torque on housing 12 is substantially zero. Since there is essentially no net force or torque on housing 12, motion of the strikers will not cause housing 12 to strike wall 21 of shot hole 20.

Each of the three strikers, in striking wall 21 to generate shear waves, is substantially a unidirectional seismic source. The three strikers are coupled to housing 12 in the manner described above to reduce recoil of the housing. It will be appreciated that any plurality of unidirectional seismic sources may be coupled to a housing in a similar manner to reduce housing recoil and are within the scope of this invention. Where only two such sources are coupled to the housing in a manner that they exert equal and opposite forces on wall 21, the two sources should be fired at different times to avoid total cancellation of the shear waves generated. It will also be understood that the purpose of reducing recoil of housing 12 is achieved even if the net torque or the net force of recoil is not zero. Thus, so long as recoil of housing 12 is reduced, the ratio of surface areas and the locations on housing 12 of the three strikers may differ from the above description and will still come within the scope of this invention.

It may be desirable for seismic source 10 to be fired repeatedly with little delay between the successive firings. After each firing, strikers 16a, 16b and 16c must be restored to their prefiring positions in channels 15a, 15b and 15c in order to repeat the firing. To facilitate this process, strikers 16a, 16b and 16c are restrained so that the strikers do not lose contact with their respective channels. The restraining mechanism will be described later.

As the strikers hit portions 22 and 24, they will rebound from the portions. If the strikers are still in contact with housing 12 during their rebound, the forces of rebound will be transmitted to some extent to housing 12. If the forces of rebound are not in opposite directions, as is the case when portion 24 is not parallel to portion 22, the forces of rebound may cause housing 12 to move and strike wall 21 of shot hole 20. Therefore, preferably, portions 22 and 24 are substantially parallel.

Figure 2:
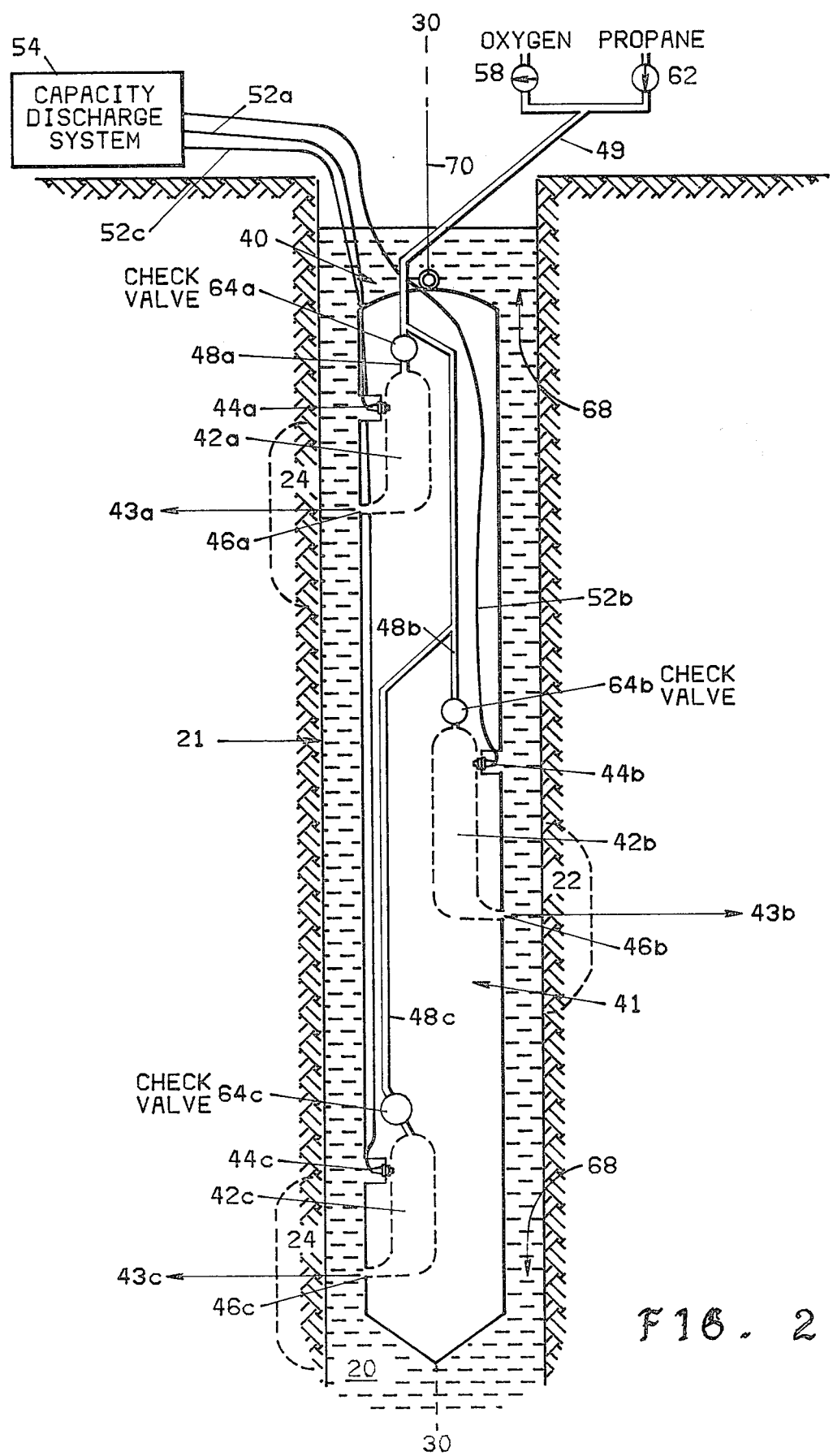
FIG. 2 is a schematic simplified view of a shear wave seismic source illustrating another embodiment of this invention.

FIG. 2 is a schematic simplified view of a shear wave seismic source illustrating another embodiment of this invention. In reference to FIG. 2, seismic source 40 comprises body 41, which defines three chambers 42a, 42b and 42c, all separate from one another. Body 41 may be suspended in a medium 68 in shot hole 20 by a cable 70. The three chambers 42a, 42b and 42c communicate with medium 68 through respective vent ports 46a, 46b and 46c in body 41. Explosive gas may be introduced into each of the three chambers and ignited. Gas from the explosions will be vented through the vent ports 46a, 46b and 46c to impact upon portions 22 and 24 of wall 21 along lines 43a, 43b and 43c, respectively.

The directions of the gas vented through ports 46a, 46b and 46c, as indicated by arrows in FIG. 2, may be said to be the directions of lines 43a, 43b and 43c, respectively. Lines 43a, 43b and 43c are substantially normal to selected plane 30. Shear waves are generated from the locations of portions 22 and 24. But to observers at distant observation points on plane 30, such waves are substantially generated at points on plane 30. Hence, source 40 will generate substantially no pressure wave at distant points in selected plane 30. As in the preferred embodiment, it is not necessary for plane 30 to pass through the shot hole; plane 30 needs only be close to the shot hole.

The amounts of explosive gas ignited in the three chambers are such that gas from the explosions escaping through the vent ports exerts substantially equal and opposite forces on body 41. To achieve this result, the size of the chambers 42a and 42c are approximately the same, and the size of chamber 42b may be approximately twice that of chamber 42a. Thus, if the three chambers are filled with similar explosive gas and then ignited, the force exerted on body 41 by gas escaping from chamber 42a through vent port 46a is substantially equal to the force exerted on body 41 by gas escaping from chamber 42c through vent port 46c; and the force exerted on body 41 by gas escaping from chamber 42b through vent port 46b may be approximately twice that exerted by gas escaping from chamber 42a. Vent ports 46a, 46b and 46c are so oriented in housing 12 that line 43b is substantially opposite in direction to lines 43a and 43c. Thus, gas escaping from the three chambers exerts substantially equal and opposite forces on body 41 so that there is essentially no net force of recoil on body 41. If the center of gravity of body 41 lies substantially on line 43b, and line 43b is substantially coplanar with and equidistant from lines 43a and 43c, there is no net torque on body 41 to cause rotational motion. Therefore, generation of seismic waves by gas explosions in the three chambers will not cause body 41 to recoil and hit the wall of shot hole 20. Parallel to the first preferred embodiment, housing 12 may contain any number of chambers in excess of one chamber. If it contains only two chambers, gas in the two chambers is preferably sparked at different times. The locations of the vent ports may be varied from those in the above description in any way as long as the net recoil of body 41 is reduced. It will be understood that all such configurations come within the scope of this invention.

A suitable explosive gas that may be used is a mixture of propane and oxygen, in the proper proportions for complete combustion. To introduce such a mixture into the chambers, valves 58 and 62 are turned on so that the mixture will flow through a conduit 49 which leads to chambers 42a, 42b and 42c through conduits 48a, 48b and 48c, and check valves 64a, 64b and 64c, respectively. The check valves allow only one way gas flow and prevent the gas in the chambers from flowing back towards valves 58 and 62. To prevent the gas mixture from escaping from the three chambers, the three vent ports are such that each opens at the bottom of the respective chamber and shot hole 20 is filled with a liquid 68 such as water to trap the gas mixture inside the chambers. Spark plugs 44a, 44b, and 44c are located near the upper end of the chambers to ignite the gas therein. Spark plugs 44a, 44b and 44c are sparked at the times desired by capacity discharge system 54 through wires 52a, 52b and 52c. After the three chambers are filled with the gas mixture, valves 58 and 62 are turned off. After the detonations, valve 58 is opened so that oxygen, being lighter than the exhaust gas, will displace the exhaust gas inside the chambers and the exhaust gas will escape into medium 68. Valve 58 is then closed and valve 62 is turned on so that a suitable amount of propane is let into the three chambers to form a suitable combustible mixture. The next cycle of detonation and generation of seismic waves may then be started.

Figure 3:
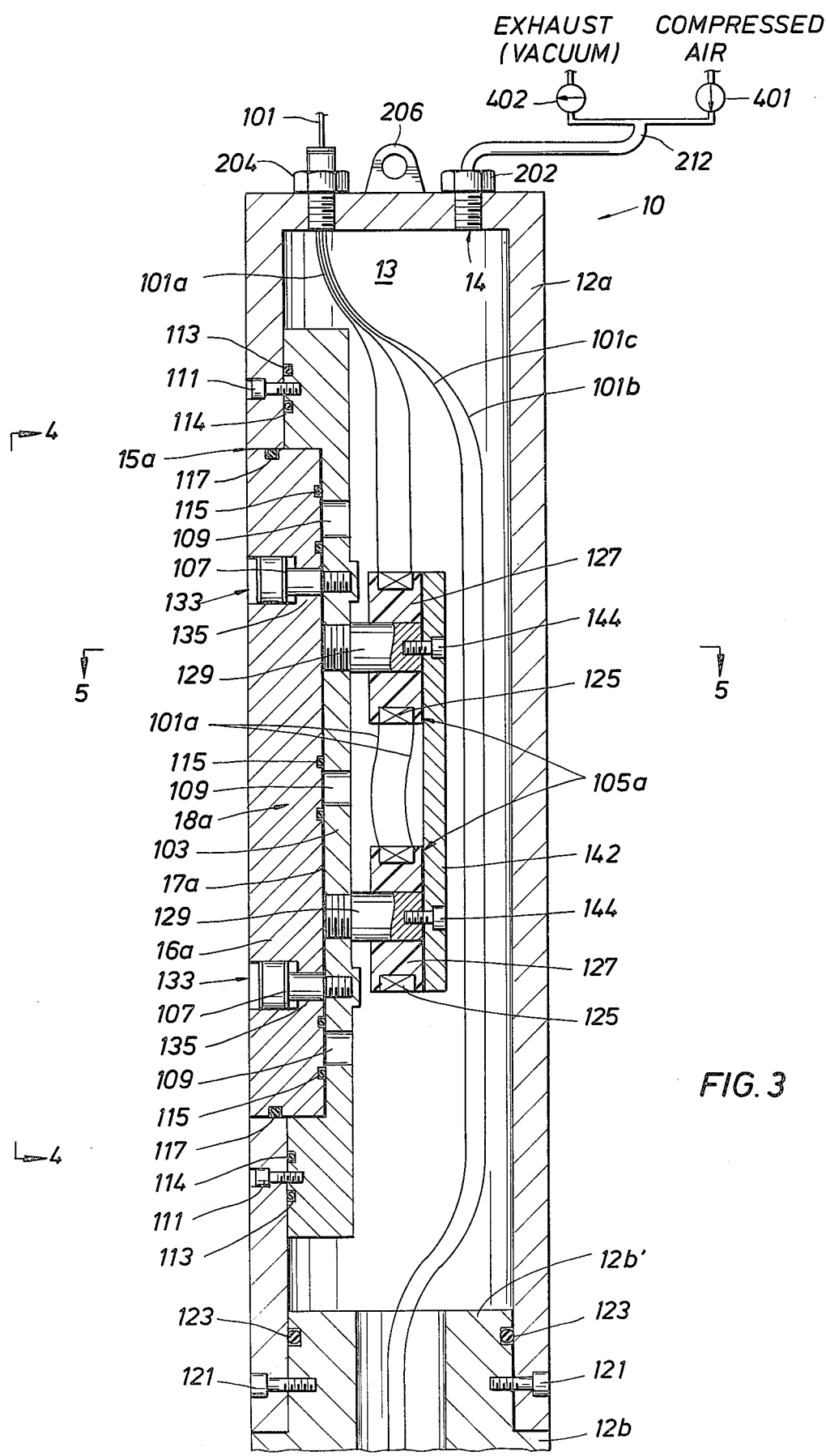
FIG. 3 is a partially cross-sectional and partially schematic view of the upper section of a shear wave seismic source illustrating the preferred embodiment of this invention.

FIG. 3, 4, 5 and 6 illustrate in more detail the preferred embodiment of this invention. In the preferred embodiment, housing 12 may be a hollow cylinder closed at both ends. For convenience in assembly and repair, housing 12 comprises four separate sections: 12a, 12b, 12c and 12d. FIG. 3 is a partially cross-sectional and partially schematic view of section 12a and a portion of section 12b. Section 12a forms the top part of housing 12 in FIG. 1. Section 12a comprises a hollow cylinder closed at the top end and open at the bottom end. Attached to the top end of section 12a is a ring 206 by means of which section 12a may be suspended conveniently. The closed end of section 12a has a port 14 through which a suitable screw connector 202 may be used to connect chamber 13 sealingly to an air hose 212.

Figure 4:
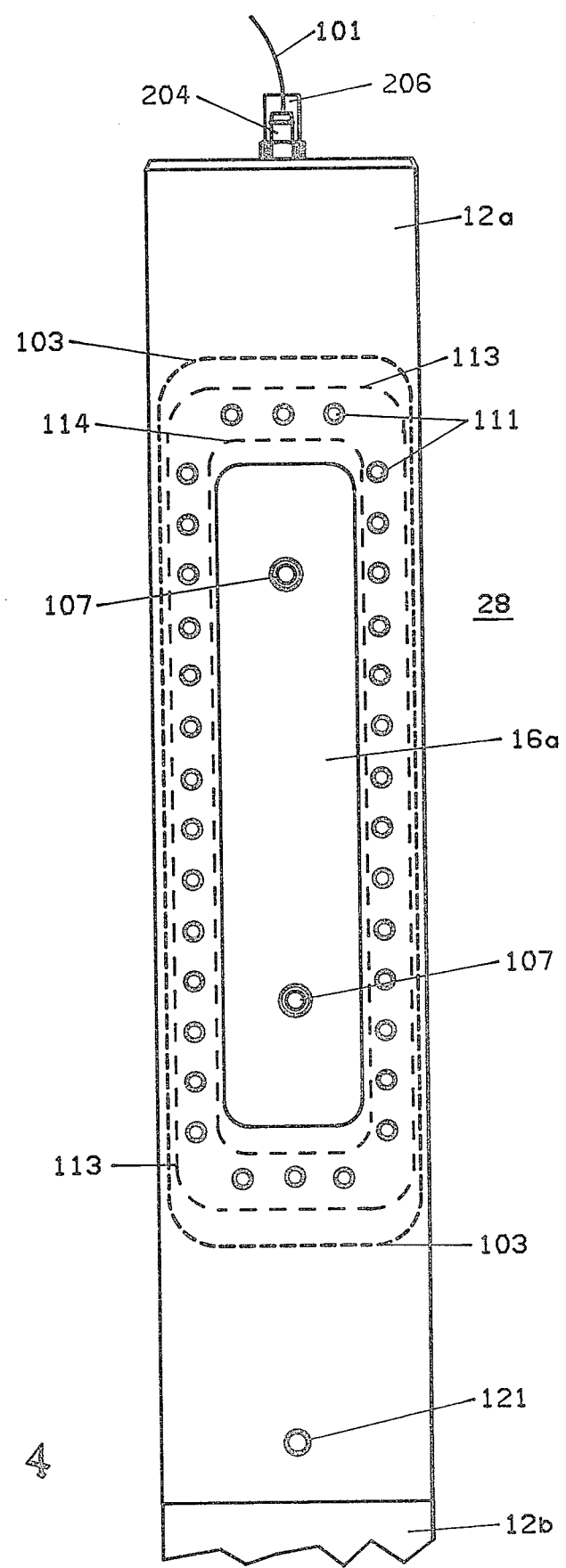
FIG. 4 is a view from the outside of the upper section of the seismic source shown in FIG. 3 as viewed from direction 4 in FIG. 3.
Figure 5:
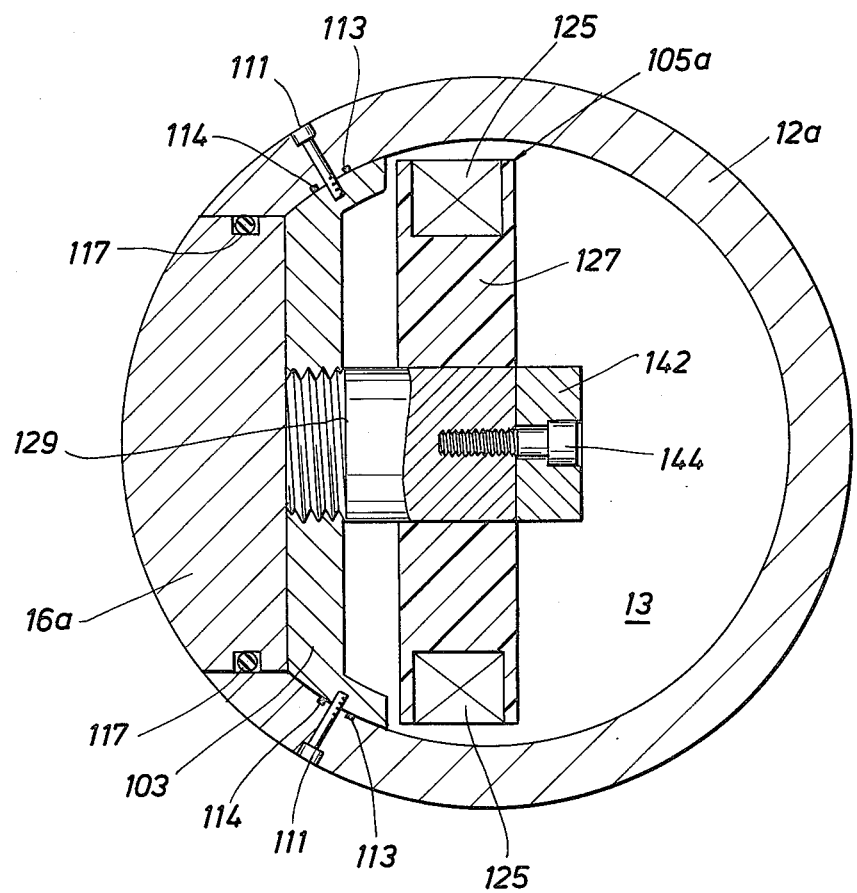
FIG. 5 is a view taken along line 5—5 in FIG. 3 showing a cross-section of the seismic source.

In the preferred embodiment, striker 16a may be a plate shaped in a manner to be described. The restraining mechanism on striker plate 16a comprises bulk head 103, electromagnets 105a, restraining bolts 107, and various bolts and O-rings to maintain sealing contacts between the different elements. The structure of this restraining mechanism may be seen clearly in reference to FIGS. 3, 4 and 5. FIG. 4 is a view from the outside of the section of the seismic source as shown in FIG. 3 viewed along direction 4 in FIG. 3. FIG. 5 is a view taken along line 5—5 in FIG. 3 showing a cross-section of section 12a. Section 12a has a rectangular hole 15a in which striker plate 16a fits snugly. The outside surface of striker plate 16a is curved so that when plate 16a is fitted into section 12a, plate 16a and section 12a together exhibit a complete cylindrical surface on the outside, as may be seen from FIG. 5. Striker plate 16a is thicker than the wall of section 12a and protrudes into chamber 13 inside section 12a. A rectangular shaped bulkhead 103, with a recess shaped to fit the protruding portion of plate 16a, is bolted onto the inside wall of section 12a surrounding striker plate 16a. In striker plate 16a and bulkhead 103 are drilled a plurality of holes through which restraining bolts 107 may be inserted from the side of the striker plate. Each of the bolts 107 comprises a head and a body. The body has two parts, an end part which is threaded and a middle part which is not threaded. The holes in bulkhead 103 are threaded whereas the holes 133 in striker plate 16a are not. The threaded portions of bolts 107 are designed to fit tightly into the holes in bulkhead 103 by application of torque. When bolts 107 are in place, the threaded portions are entirely embedded in the bulkhead 103, so that striker plate 16a is only in contact with the head and the unthreaded portions of bolts 107. The holes 133 in striker plate 16a are large enough so that the heads of bolts 107 may pass therethrough, leaving no protruding portion when bolts 107 are in place. Thus, plate 16a may move along the axis of bolts 107 unobstructed by the heads of the bolts. To prevent the striker plate from moving too far, and thereby becoming disengaged from section 12a, flanges 135 are provided at the inner ends of holes 133 adjacent to bulkhead 103. With the above arrangement, striker plate 16a may move outwards from section 12a for a selected distance and is then stopped when flanges 135 are in contact with the heads of bolts 107. O-ring 117 seals the contacting surfaces between striker plate 16a and section 12a. Bulkhead 103 is attached to section 12a by means of bolts 111, and O-rings 113 and 114 seal the contacting surfaces between bulkhead 103 and section 12a.

To hold striker plate 16a in place until seismic source 10 is ready to be fired, electromagnets 105a are provided which are attached to bulkhead 103. In the preferred embodiment, two electromagnets are used to hold plate 16a in place. Each of the two electromagnets 105a comprises insulated wires 125 wound around a bobbin 127 concentrically mounted onto a soft iron core 129. Soft iron cores 129 have threaded ends which may be screwed into holes in bulkhead 103 so that soft iron cores 129 come into contact with plate 16a. Wires 125 are wound in opposite directions in the two electromagnets 105a to prevent cancellation of magnetic fields. A soft iron plate 142 is attached to electromagnets 105a by screws 144 to complete the magnetic circuit. Wires 125 from electromagnets 105a are connected to a cable 101a through which current may be supplied to the two electromagnets. Similarly cables 101b and 101c supply current to the electromagnets for controlling striker plates 16b and 16c in sections 12b and 12c. The three cables 101a, 101b and 101c form a large cable 101 which passes through the closed end of section 12a sealingly by a suitable screw connector 204. Cable 101 is connected to firing circuits described below.

The pressure in chamber 13 may be increased by turning on valve 401, which supplies pressurized air through air hose 212. Air ports 109 are provided in bulkhead 103 so that the pressure in chamber 13 may act upon plate 16a. O-rings 115 seal the contacting surfaces between plate 16a and bulkhead 103 around air ports 109. Striker plate 16a is made of a ferro-magnetic material whereas section 12a and bulkhead 103 are made of non-magnetic stainless steel. Typically the hydrostatic force exerted upon plate 16a by medium 28 is negligible, and is insufficient to overcome the force exerted by compressed air in chamber 13. When current is supplied through cable 101a to electromagnets 105a, the magnetic attractive force on plate 16a is sufficient to overcome the force exerted by compressed air in chamber 13 on plate 16a through air ports 109. When the current supplied by cable 101a to electromagnets 105 is turned off, plate 16a is no longer restrained. Thus, plate 16a begins to move away from bulkhead 103, thereby breaking the seal of O-ring 115. Compressed air fills the entire volume between the bulkhead and the striker plate left open by the movement of the striker plate. Therefore, the compressed air in chamber 13 is allowed to act on face 17a of plate 16a producing a large force on plate 16a. Striker plate 16a then moves out with high speed until it impacts portion 24 of wall 21 as shown in FIG. 1. O-ring 117 prevents compressed air from leaking around the striker plate. The restraining bolts 107 limit the striker plate outward motion and prevent loss of the plate.

Figure 6:
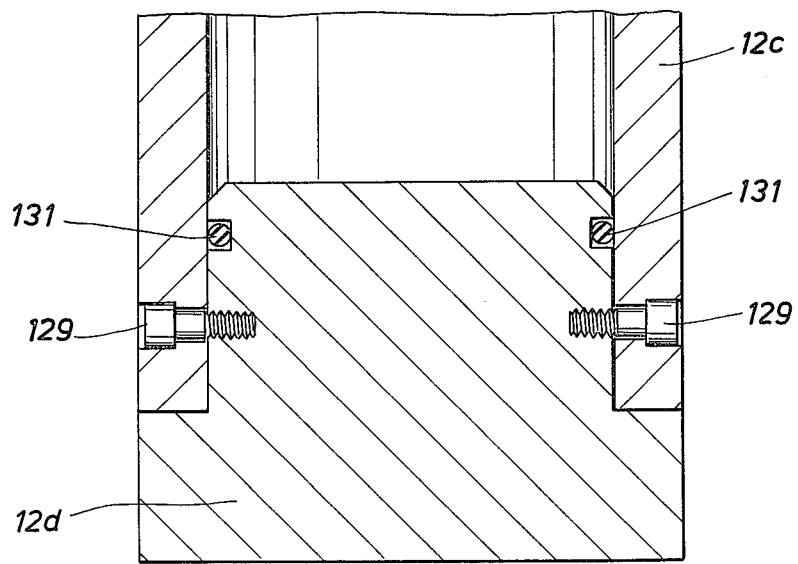
FIG. 6 is a partially cross-sectional and partially schematic view of the lower section of a shear wave seismic source illustrating the preferred embodiment of this invention.

In section 12c, striker plate 16c and the mechanism controlling the motion of plate 16c are similar to those in section 12a. In section 12b that connects sections 12a and 12c, striker plate 12b and the control mechanism are also of similar construction except that the area of face 17b is approximately twice that of the area of face 17a, and that striker plate 16b moves in a substantially opposite direction to that of striker plate 16a. The upper portion 12b' of section 12b forms a hollow cylinder with outside diameter approximately the same as the inside diameter of section 12a. This upper portion 12b' may be inserted into the lower end of section 12a and the two sections fastened together by bolts 121. O-ring 123 seals the contacting surfaces between the sections. Section 12c has an upper portion similar to 12b' and may be connected to 12b in a similar manner. FIG. 6 shows the connection between sections 12c and 12d. Section 12d is a cylindrical body with the upper portion of section 12d having a smaller diameter compared to the bottom portion. The diameter of the upper portion of section 12d is approximately the same as the inside diameter of section 12c so that this upper portion may be inserted in the bottom of section 12c to close the bottom end of section 12c. Sections 12c and 12d are bolted together by bolts 129, and an O-ring 131 seals the contacting surfaces between the two sections.

Figure 7:
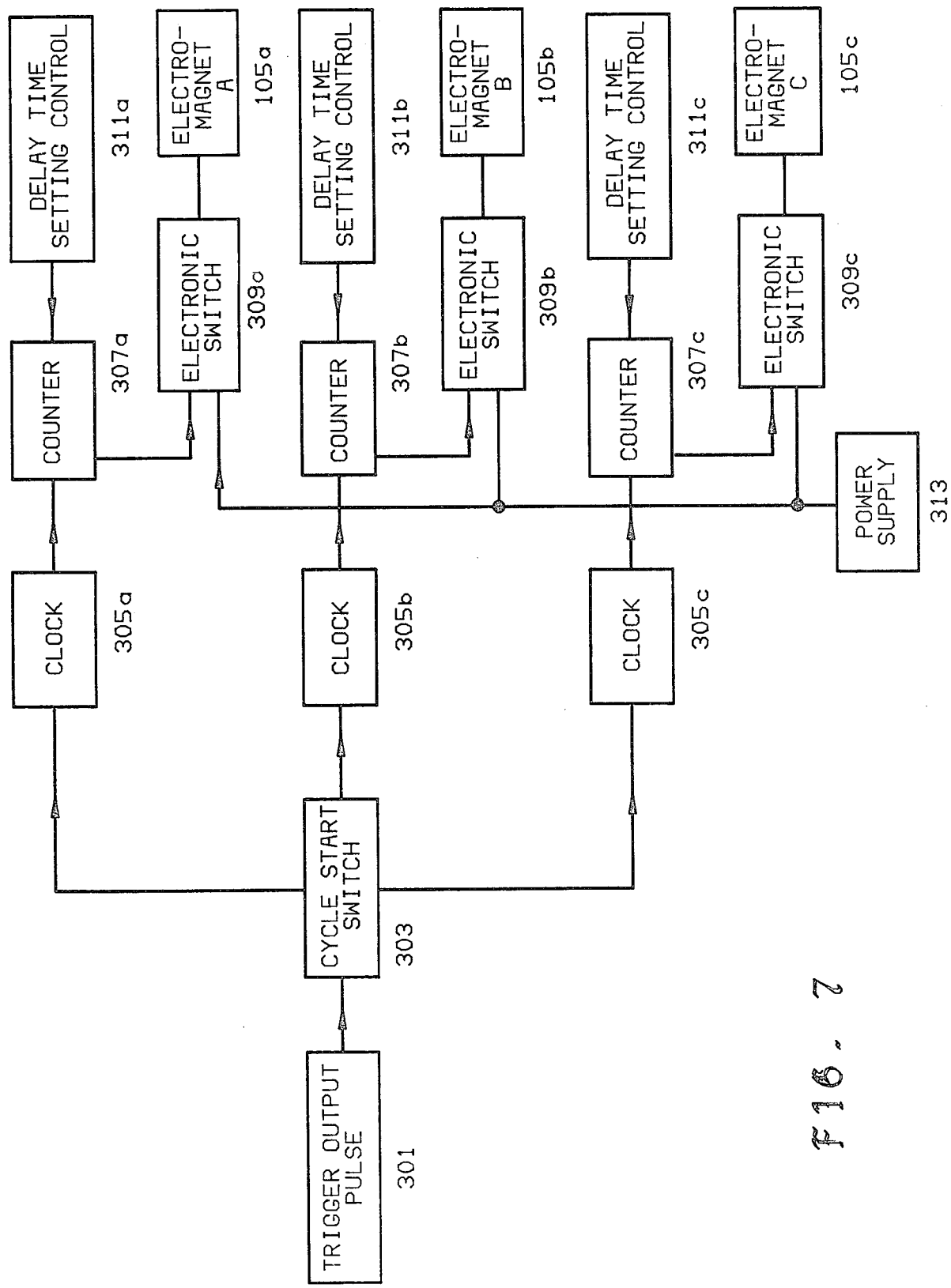
FIG. 7 is a schematic diagram of a circuit for releasing the strikers in the seismic source shown in FIGS. 1 and 3 at the respective times set for their release.

It may be desirable to release the strikers 16a, 16b and 16c to strike wall 21 at different times. This may be accomplished by turning off current to the electromagnets restraining the respective strikers at different times as illustrated by FIG. 7. The cycle of turning off current at selected delay times to the electromagnets to release the three strikers may be called a firing cycle. In preparation for the firing cycle, electronic switches 309a, 309b and 309c are switched to the "ON" position so that power supply 313 supplies current to electromagnets 105a, 105b and 105c which hold the three striker plates in place. The time delays for turning off electromagnets 105a, 105b and 105c are set in respective setting controls 311a, 311b and 311c. To start the firing cycle, cycle start switch 303 is turned on. A trigger pulse from generator 301 is then supplied to clocks 305a, 305b and 305c. Clock 305a is triggered by the pulse and the time of clock 305a is monitored by a counter 307a. Counter 307a continually compares the delayed time set in the setting control 311a and the time of the clock 305a. When the time of clock 305a reaches the delayed time set in setting control 311a, counter 307a sends a pulse to switch off electronic switch 309a thereby turning off electromagnets 105a and releasing striker plate 16a. Current to electromagnets 105b and 105c is turned off in a similar manner after the delayed times set in setting controls 311b and 311c are reached.

The circuit shown in FIG. 7 may also be used to introduce time delays in the sparking of gas in chambers 42a, 42b and 42c of seismic source 40 as shown in FIG. 2. Instead of being connected to electromagnets, electronic switches 309a, 309b and 309c are connected to spark plugs 44a, 44b and 44c, respectively. Electronic switches 309a, 309b and 309c are in the "OFF" position when the firing cycle starts, and pulses from the counters 307a, 307b and 307c will switch on the respective switches so that current is supplied to the respective spark plugs. Other than such modifications, the circuit in FIG. 7 operates to trigger the firing of source 40 in a similar manner as it does with source 10.

As explained earlier, the recoil of housing 12 caused by the motion of striker 16b is substantially cancelled by the recoil caused by the motions of strikers 16a and 16c, after all three strikers are released. If the three strikers are released at different times, there may be a short time interval between the releases when the net recoil of housing 12 is not zero. If this time interval is short, housing 12 will not have moved far enough to strike wall 21 before the later releases balance and cancel all recoil on housing 12. Since striker plates 16a, 16b and 16c move out from housing only for short distances, the change in volume of chamber 13 between the firings is negligible and will not significantly reduce the pressure in chamber 13 during the later firings.

To restore the striker plates 16Aa, 16b and 16c to their prefiring original positions, valve 401 in FIG. 3 is turned off and valve 402 is opened, whereby air hose 212 is connected to a vacuum to depressurize chamber 13. When the pressure in chamber 13 falls below atmospheric pressure, striker plates 16a, 16b and 16c will be pushed back towards housing 12 until they are again in contact with the electromagnets. Electronic switches 309a, 309b and 309c in FIG. 7 are turned to the "ON" position and the magnetic attractive forces exerted by the electromagnets will again restrain the striker plates. Seismic source 10 is then ready for another cycle of firing and generation of seismic shear waves.

It has been shown earlier that if a unidirectional point seismic source is used as the shear wave source, no pressure waves, but only shear waves, will reach distant observation points located on a plane which passes through the point source and which is normal to the direction of the force exerted by the source. Typically, shear waves with a range of frequencies are generated by unidirectional point seismic sources. In some situations it may be desirable to enhance the generation of shear waves with certain frequencies in that frequency range and to retard the generation of shear waves with other frequencies in that frequency range. High frequency shear waves are attenuated by the earth more severely than low frequency shear waves. Thus, if both high frequency and low frequency shear waves are generated, the reflections of low frequency shear waves detected will typically have higher amplitudes than reflections of high frequency shear waves, so that the information conveyed by high frequency reflections may not be readily retrieved. Therefore, it may be desirable to enhance the generation of high frequency shear waves and to retard the generation of low frequency shear waves. This purpose may be achieved by combining a number of unidirectional point seismic sources in the manner to be described below.

FIG. 8 illustrates how three unidirectional point seismic sources may be used in a preferred method of this invention to enhance the generation of shear waves with certain selected frequencies and to retard the generation of shear waves with other frequencies. An xyz coordinate system is selected so that the yz-plane is the observation plane. The seismic sources are to be applied in such a manner that substantially no pressure wave is observed at any point on the yz-plane distant from the seismic sources. Three source points $S_1$, $S_2$ and $S_3$ are selected so that they are substantially collinear, that the source point $S_2$ lie in between source points $S_1$ and $S_3$ and is substantially equidistant from the other two source points. In the preferred method $S_2$ is at the origin. $S_1$ is on the negative z axis, a distance H below $S_2$, and $S_3$ is on the positive z axis, a distance H above $S_2$. Lines 301, 302 and 302 are chosen so that they are substantially parallel to the x axis and they pass through source points $S_1$, $S_2$ and $S_3$, respectively. The three lines are thus substantially normal to the yz-plane. Lines 301 and 303 are shown as pointing in the negative x direction and line 302 in a positive x direction. Line 302 may be said to have a direction opposite to the direction of lines 301 and 303.

A unidirectional point seismic source is placed at $S_1$ and is used to apply a first force along the line 301 to generate a first shear wave 311 in the yz-plane, which may be observed at a distant observation point 0 on the yz-plane. A second unidirectional point seismic source is placed at source point $S_2$. After a selected time T has elapsed since the application of the first force, the second seismic source may be used to apply a second force along the line 302. This second force applied has a magnitude substantially twice that of the first force. A second shear wave 312 is thereby generated and is also observed at point 0. The second shear wave 312 lags behind the first shear wave 311. The phase difference between the two shear waves is dependent on the selected time delay T and the separation H between the source points $S_1$ and $S_2$. A third unidirectional seismic source is placed at source point $S_3$. After substantially the same selected time delay T has elapsed since the application of the second force, the third seismic source is used to apply a third force at $S_3$ along line 303, such third force having a magnitude substantially equal to the magnitude of the first force. A third shear wave 313 is thereby generated in the yz-plane which is also observed at point 0. The third shear wave 313 lags behind second shear wave 312 by a phase difference also dependent on the delay time T and the separation H between the source points $S_2$ and $S_3$. The time separation between the applications of the first and second forces is substantially equal to the time separation between the applications of the second and third forces. The spatial separation between the corresponding source points for the first and second forces is substantially equal to the spatial separation between the source points of the second and third forces. Therefore, the phase difference at the point 0 between the shear waves 311 and 312 is substantially equal to the phase difference at 0 between the shear waves 312 and 313. Therefore, the three shear waves 311, 312 and 313 will interfere to produce a resonance at point 0 thereby enhancing the generation of shear waves with frequencies at or close to the resonance frequencies and retarding the generation of shear waves with other frequencies. The resonance frequencies may be expressed in terms of the time separation T, the spatial separation H, and the position of the observation point 0 in a conventional manner through Fourier Analysis. The apparatuses in FIGS. 1 and 2 described earlier may be used in this method.

Where the three source points substantially coincide so that there is substantially no spatial separation, the three shear waves 311, 312 and 313 will still interfere to produce a resonance. The resonance frequencies in that case are dependent only upon the time separation T and no longer on the position of the observation point 0. The resonance frequencies and the time separation T are inversely related so that an increase in the delay time will decrease the resonance frequencies. This system is therefore tunable by varying the time separation T.

If the three forces are applied substantially simultaneously so that there is essentially no time separation, the three shear waves will still interfere to produce a resonance. The resonance frequencies in this case, however, are dependent upon the position of the observation point 0 as well as the spatial separation H. At observation points on the z axis, the phase difference between the three shear waves is maximum and the resonance frequencies have the lowest values. The angle between the negative z axis and the line between the origin and the observation point 0 may be called the angular distance of the point 0. As the angular distance of the point 0 increases, the resonance frequencies increase. At observation points on the y axis, where the angular distance is 90°, the three shear waves substantially cancel each other. For a given angular distance other than 90°, the resonance frequencies are inversely related to the spatial separation H so that the system may be tuned by varying the spatial separation.

In FIG. 8, the force applied first in time is applied at $S_1$, the source point which is the closest of the source points to point 0. Therefore the shear wave generated reaches point 0 earlier than the other two shear waves because of both the spatial separation H and the time separation T. Thus, the phase differences between the shear waves caused by spatial separation are added to those caused by time separation. If the force applied first in time is applied at $S_3$, the source point which is farthest of the source points to point 0, by the time shear waves are generated at points $S_1$ and $S_2$, the shear wave originating from $S_3$ will have traveled at least part of the extra distance that it has to travel to reach point 0 compared to shear waves from $S_1$ and $S_2$. Therefore, the phase differences between the shear waves caused by time separation T will be subtracted from those caused by spatial separation.

The seismic system illustrated by FIG. 8 may be referred to as a resonance system characterized by the time separation T, spatial separation H, and the order of firing. This resonance system has a set of resonance frequencies. If it is desired to enhance the generation of shear waves over a range of frequencies broader than this set of resonance frequencies, another resonance system with different time and spatial separation characteristics may be used in conjunction with this resonance system. Even though the shear waves from one resonance system will interfere with the shear waves from another resonance system the net result of this interference is as if the two resonance systems are acting entirely independently of one another so that the resulting resonance frequencies will include both sets of resonance frequencies from the two resonance systems.

FIG. 9 illustrates how two unidirectional seismic sources may be combined to enhance the generation of shear waves with selected frequencies and retard the generation of shear waves with other frequencies. The yz-plane is again the observation plane wherein substantially no pressure wave is generated at points on the plane distant from the seismic sources. The source point S is substantially at the origin. A first seismic source placed at S is used to apply a first force substantially along the positive x axis, to generate a first shear wave. A second seismic source is placed at S. After a selected delay time T' has elapsed since the application of the first force, the second source is used to apply a second force substantially equal and opposite to the first force, to generate a second shear wave. To any observation point 0 in the yz-plane, the second shear wave lags the first shear wave in phase. The two shear waves interfere to produce a resonance. The resonance frequencies are dependent only upon time separation T' and are independent of the location of the observation point 0. The resonance frequencies are inversely related to T', and may be expressed in terms of T' through Fourier Analysis. Hence the system may be tuned by varying the time separation.

The foregoing disclosure and description of the invention are illustrative and explanatory thereof, and various changes in size, shape and materials, as well as in the illustrated construction may be made within the scope of the appended claims without departing from the spirit of the invention.

What is claimed is:

1. An apparatus for generating seismic shear waves in a selected plane, a portion of which is close to a shot hole, wherein substantially no pressure wave is generated at points on the selected plane distant from the shot hole, said apparatus comprising:
   an elongated housing adapted to be suspended in a medium filling the shot hole, said housing having therein a plurality of compartments suitable for holding explosive gas, and for each of the compartments a corresponding vent port through which the compartments communicate with the medium, wherein the vent ports are so located in the housing that, if the explosive gas in each compartment is detonated, the paths of gas escaping therefrom are substantially normal to the selected plane, and that gas from at least one vent port escapes in substantially opposite direction to gas from the remaining vent ports so that the net recoil of the housing is reduced.

2. The apparatus of claim 1, wherein the volumes of the compartments in the housing are such that after explosive gas has been detonated in all of the compartments, the net recoil of the housing is substantially zero.

3. The apparatus of claim 2, wherein the vent ports are so located in the housing that after explosive gas has been detonated in each of the compartments, the net torque on the housing about the center of gravity of the housing is substantially zero.

4. The apparatus of claim 1, further comprising means for detonating explosive gas in each compartment at a time selected for that compartment, so that the explosive gas in the compartments may be detonated successively with predetermined time intervals between the detonations.

5. The apparatus of claim 4, wherein said detonating means comprises:
 a plurality of spark plugs, each disposed in a different compartment for detonating the explosive gas therein;
 a power supply for supplying current to the spark plugs; and
 a plurality of delay time circuits, each connected between the power supply and a different spark plug for passing current through the spark plugs to create sparks at the respective selected times, wherein each circuit comprises:
   (a) means for setting the detonating time of gas in the respective compartment,
   (b) a clock,
   (c) a counter connected to the time setting means and the clock, for supplying a pulse when the time of the clock is substantially the same as the time set in the time setting means,
   (d) a switch connected to the counter, and between the respective spark plug and the power supply, said switch being responsive to the pulse from the counter for switching on current from the power supply to the respective spark plug.

6. An apparatus for generating seismic shear waves in a selected plane, a portion of which is close to a shot hole, wherein substantially no pressure wave is generated at points on the selected plane distant from the shot hole, said apparatus comprising:
 a plurality of strikers; and
 an elongated housing adapted to be suspended in the shot hole and adapted to hold gas under high pressure, said housing having a plurality of channels each adapted to receive slidably therethrough one of the plurality of strikers, said channels being so located that, if the strikers are propelled outwards through the channels by compressed gas in the housing, the strikers will move along lines substantially normal to the selected plane, and that the line of at least one striker is substantially opposite to the lines of the remaining strikers, so that the net recoil of the housing is reduced.

7. An apparatus as in claim 6, further comprising releasable restraining means for holding the strikers until they are to be fired.

8. An apparatus as in claim 7, wherein the strikers are made of a ferromagnetic material, and wherein the housing is made of a nonferromagnetic material.

9. An apparatus for generating seismic shear waves in a selected plane, a portion of which is close to a shot hole, wherein substantially no pressure wave is generated at points on the selected plane distant from the shot hole, said apparatus comprising:
 a plurality of strikers made of a ferromagnetic material;
 an elongated housing made of a nonferromagnetic material adapted to be suspended in the shot hole and adapted to hold gas under high pressure, said housing having a plurality of channels each adapted to receive slidably therethrough one of the plurality of strikers, said channels being so located that, upon propelling the strikers outward through the channels by compressed gas in the housing, each striker moves in a direction substantially normal to the selected plane, and that the direction of motion of at least one striker is substantially opposite to the directions of motion of the remaining strikers, so that the net recoil of the housing is reduced;
 a plurality of electromagnets attached to the housing near the channels, for restraining the strikers until they are to be fired;
 a power supply connected to said plurality of electromagnets; and
 a plurality of releasing means, each connected between the power supply and the electromagnets for restraining one of the strikers, for releasing each striker individually and at a time selected for that striker.

10. An apparatus as in claim 9, wherein each releasing means comprises:
 means for setting the firing time of a striker to be released;
 a clock;
 a counter, connected to the time setting means and the clock, said counter being adapted to supply a pulse if the time of the clock is substantially the same as the time set in the time setting means; and
 a switch connected to the counter and between the power supply and the electromagnets which restrain the striker to be released, said switch being responsive to the pulse from the counter for switching off current from the power supply to the electromagnets.

11. An apparatus as in claim 6, further comprising a plurality of restraining bolts, connected rigidly to the housing and slidably to the strikers, for restricting the distances that the strikers are permitted to move outwards from the housing to strike the shot hole wall, so that the strikers may be readily re-positioned for repeated firings.

12. An apparatus as in claim 11, wherein the strikers are each adapted to move sealingly through the respective channel, and each is of such dimensions that it may move outwards to strike the shot hole wall upon firing and move back to the pre-firing position without breaking its sealing contact with the respective channel.

13. An apparatus for generating seismic shear waves in a selected plane, a portion of which is close to a shot hole, said shot hole having two portions of the shot hole wall substantially parallel to each other, wherein no pressure wave is generated at points on the selected plane distant from the shot hole, said apparatus comprising:
 a plurality of ferromagnetic striker plates;
 a hollow non-ferromagnetic cylinder, closed at both ends defining a chamber, adapted to be suspended in the shot hole and adapted to hold compressed gas under high pressure, said cylinder having a plurality of channels in its cylindrical surface, each adapted to receive slidably and sealingly therethrough a striker plate, said channels being so located in the cylinder that, if propelled by compressed gas, the striker plates will move along lines substantially normal to the selected plane to strike the two portions of the shot hole wall, and that at least one of the striker plates move in opposite directions to the remaining striker plates;

compressed gas supply means connected to the chamber in the cylinder;

restraining bolts connected rigidly to the cylinder and slidably to the striker plates for restricting the distances that the striker plates are permitted to move outwards upon firing to strike the two portions;

a plurality of electromagnets attached to the cylinder near the channels, said electromagnets being so located that each striker plate is in contact with two electromagnets so that each striker plate may be restrained by magnetic force exerted by the two electromagnets;

a power supply connected to said plurality of electromagnets; and a plurality of releasing means, each connected between the power supply and the two electromagnets that are in contact with one of the plurality of striker plates, for releasing that striker plate at a time selected for that striker plate, so that the plurality of striker plates may be released at different times.

14. An apparatus as in claim 11 or 13, wherein the sum of the cross-sectional areas of the channels receiving strikers moving in one direction is substantially equal to the sum of the cross-sectional areas of the channels receiving strikers moving in a substantially opposite direction so that the net recoil of the housing after the release of all the strikers is substantially zero.

15. An apparatus as in claim 14, wherein the channels are so located in the housing that, after the release of all the strikers, the net torque on the housing about the center of gravity of the housing is substantially zero.

16. An apparatus as in claim 13, wherein each releasing means comprises:

means for setting the firing time of a striker to be released;

a clock;

a counter, connected to the time setting means and the clock, said counter being adapted to supply a pulse if the time of the clock is substantially the same as the time set in the time setting means; and a switch connected to the counter and between the power supply and the two electromagnets in contact with the striker to be released, said switch being responsive to the pulse from the counter for switching off current from the power supply to the two electromagnets.

17. A method for generating seismic shear waves in a zone of the earth, wherein substantially no pressure wave is generated in portions of a selected plane in the zone, said method comprising:

applying a first force at a first source point substantially in the selected plane, and along a first line substantially normal to the selected plane to generate a first shear wave in the selected plane;

applying a second force at a selected second source point substantially in the selected plane, and in a direction substantially opposite to the direction of the first force, said second force having a magnitude substantially twice the magnitude of the first force, in order to generate a second shear wave in the selected plane which, at any distant observation point in the selected plane, lags the first shear wave in phase by a predetermined amount; and applying a third force at a selected third source point substantially in the selected plane, and in a direction substantially opposite to the direction of the second force, said third force having a magnitude substantially equal to the magnitude of the first force, in order to generate a third shear wave in the selected plane which, at the distant observation point, lags the second shear wave in phase by the same predetermined amount, such that the first, second and third shear waves will interfere constructively at the distant observation point to produce a resonance, and so that no reactive force associated with any of said first, second, and third forces, which reactive force is not also one of said first, second, and third forces, is applied to the zone of earth, and so that the reaction forces associated with said first, second, and third forces substantially cancel.

18. A method as in claim 17, further comprising the step of selecting a delay time, and wherein the steps of applying the first and second forces are separated by the selected delay time, and the steps of applying the second and third forces are also separated by substantially the same selected delay time.

19. A method as in claim 17, wherein the second source point is substantially collinear with and equidistant from the first and third source points.

20. A method for generating seismic shear waves in a zone of the earth, wherein substantially no pressure wave is generated in portions of a selected plane in the zone, said method comprising:

applying a first force at a source point substantially in the selected plane, and along a line substantially normal to the selected plane to generate a first shear wave in the selected plane; and applying a second force substantially equal and opposite to the first force a selected delay time after the first force is applied, substantially at the same source point, to generate a second shear wave in the selected plane, so that at any distant observation point in the selected plane the second shear wave will interfere with the first shear wave to produce a resonance, and so that no reactive force associated with either of said first and second forces, which reactive force is not said second force, is applied to the zone of earth, and so that the reaction forces associated with said first and second forces substantially cancel.

21. A method as in claim 20, further comprising the step of selecting a delay time so that the resonance frequencies of the resonance produced by the interference of the first and second shear waves are of the desired values, said resonance frequencies being dependent only upon the selected delay time and being inversely related thereto.

22. A method for generating seismic shear waves in a zone of the earth, wherein substantially no pressure wave is generated in portions of a selected plane in the zone, said method comprising:

applying a first force at a source point substantially in the selected plane, and along a line substantially normal to the selected plane to generate a first shear wave in the selected plane;

after a first selected delay time has elapsed since the application of the first force, applying a second force substantially at the same source point and in a direction substantially opposite to the direction of the first force, said second force having a magnitude substantially equal to twice the magnitude of the first force, to generate a second shear wave in the selected plane; and after a second selected delay time substantially the same as said first selected delay time has elapsed since the application of the second force, applying a third force substantially at the same source point and in a direction substantially the same as the direction of the first force, said third force having a magnitude substantially equal to the magnitude of the first force, to generate a third shear wave in the selected plane, so that at any distant observation point in the selected plane, the first, second and third shear waves will interfere with one another to produce a resonance, and so that no reactive force, associated with any of said first, second, and third forces, which reactive force is not also one of said first, second, and third forces, is applied to the zone of earth, and so that the reaction forces associated with said first, second, and third forces substantially cancel.

23. A method as in claim 22, further comprising the step of selecting a delay time so that the resonance frequencies of the resonance produced by the interference of the three shear waves are of the desired values, said resonance frequencies being dependent only upon the selected delay time and being inversely related thereto.

24. A method for generating seismic shear waves in a zone of the earth, wherein substantially no pressure wave is generated in portions of a selected plane in the zone, said method comprising:

applying a first force at a first source point substantially in the selected plane, and along a line substantially normal to the selected plane to generate a first shear wave in the selected plane;

applying a second force at a selected second source point substantially in the selected plane and in a direction substantially opposite to the direction of the first force, said second force having a magnitude substantially twice the magnitude of the first force, to generate a second shear wave in the selected plane; and applying a third force at a third source point which is selected so that the second source point is substantially collinear with and equidistant from the first and third source points, wherein the direction of the third force is substantially opposite to the direction of the second force, said third force having a magnitude substantially equal to the magnitude of the first force, to generate a third shear wave in the selected plane, so that, at any distant observation point in the selected plane, the first, second and third shear waves will interfere to produce a resonance, and so that no reactive force associated with any of said first, second, and third forces, which reactive force is not also one of said first, second, and third forces, is applied to the zone of earth, and so that the reaction forces associated with said first, second, and third forces substantially cancel.

25. The method of claim 24, further comprising the step of selecting the distances between the three source points so that the resonance frequencies of the resonance produced by the interference of the three shear waves are of the desired values, wherein for distant observation points in the plane, said resonance frequencies increase with the angular distance of the observation point but are inversely related to the distances between the source points.

26. The method of claim 24, further comprising the step of selecting a delay time, and wherein the application of the first force precedes the application of the second force by the selected delay time, and the application of the second force precedes the application of the third force by substantially the same delay time.

27. The method of claim 26, wherein the first force is applied at the closest source point to the observation point and the third force is applied at the farthest source point to the observation point, so that the phase differences between the three shear waves caused by the time separation between the force application steps are added to the phase differences between the three shear waves caused by the spatial separation between the three source points in decreasing the resonance frequencies.

28. The method of claim 26, wherein the third force is applied at the closest source point to the observation point and the first force is applied at the farthest source point to the observation point, so that the phase differences between the three shear waves caused by the time separation between the force application steps are subtracted from the phase differences between the three shear waves caused by the spatial separation between the three source points in decreasing the resonance frequencies.

29. A method of generating seismic shear waves in a selected plane in a zone of the earth, a portion of which plane is close to a shothole, wherein substantially no pressure wave is generated at points in the selected plane distant from the shot hole, comprising:

employing at least two resonance systems, proximate in time and space and each of which applies a plurality of forces to the wall of the shot hole in directions substantially normal to said selected plane in such a manner that each of said plurality of forces generates a seismic shear wave in the selected plane but substantially no pressure wave at all points in the selected plane distant from the shot hole, and so that no reactive force associated with any of said plurality of forces, which reactive force is not also one of said plurality of forces, is applied to the shot hole wall, and so that the resonance frequencies of the resulting system at any distant observation point in the selected plane includes the resonance frequencies at that point of all the resonance systems employed.

* * * * *